United States Patent [19]
Van Kersen et al.

[11] Patent Number: 5,402,423
[45] Date of Patent: Mar. 28, 1995

[54] DATA TRANSMISSION SYSTEM AND INTERFACE MODULE AND PRIORITY GENERATION MEANS INCLUDED THEREIN

[75] Inventors: Gijsbert C. Van Kersen, Antwerp, Belgium; Charles F. M. Johann, Eindhoven, Netherlands

[73] Assignee: Alcatel N.V., Amsterdam, Netherlands

[21] Appl. No.: 109,096

[22] Filed: Aug. 19, 1993

[30] Foreign Application Priority Data

Aug. 21, 1992 [EP] European Pat. Off. .......... 92202555

[51] Int. Cl.⁶ .............................................. H04J 3/02
[52] U.S. Cl. ................. 370/85.6; 360/825.51
[58] Field of Search ............ 370/85.6, 85.13, 85.1, 370/60, 94.1, 85.2, 85.9; 340/825.5, 825.51

[56] References Cited

U.S. PATENT DOCUMENTS

| | | | |
|---|---|---|---|
| 5,107,492 | 4/1992 | Roux et al. ......................... | 370/85.6 |
| 5,115,430 | 5/1992 | Hahne et al. ....................... | 370/85.6 |
| 5,121,383 | 6/1992 | Golestani ............................ | 370/60 |
| 5,237,568 | 8/1993 | Woest et al. ...................... | 370/85.13 |

OTHER PUBLICATIONS

GLOBECOM 1990, vol. 3, Dec. 1990, New York, US, pp. 1431–1437, J. Y. Hui et al., "Queueing Strategies for Multicast Packet Switching", p. 1432, left column, line 27–line 45.

IBM Technical Disclosure Bulletin, vol. 27, No. 5, Oct. 1984, New York, US, pp. 3051–3052, P. Borgnis Desbordes et al., "Variable Speed Adapter for Data Transmission", the whole document.

*Primary Examiner*—Douglas W. Olms
*Assistant Examiner*—Huy D. Vu
*Attorney, Agent, or Firm*—Ware, Fressola, Van Der Sluys & Adolphson

[57] ABSTRACT

The interface modules (LIM1, . . , LIM8) control the access of information packets, received via terminal interconnections (TI11, . . . , TI82), to a common databus (DB). This access is for all interface modules granted by means of a grant signal transmitted over a priority bus (AB). Each interface module includes a priority generation module (PG) which determines a priority value (PR1) for this module. Based on this priority value, the interface modules compete with each other to gain access to the databus. The priority value (PR1) is transmitted over the priority bus (AB) and is determined dynamically based on at least one characteristic of the packets, e.g. on the age of the oldest byte of the packets waiting for transmission in the interface module and/or of the type of information contained in the packets. Two embodiments of the priority generation module (PG) are described, one based on a software program and one based on the value, at the time of receipt of a grant signal, of counters associated with each queued packet of the interface module.

18 Claims, 3 Drawing Sheets

```
minimum_priority:=inf;
lim_selected_for_transmission:=UNDEFINED;
for current_lim:=first_lim to last_lim do
begin nr_of_packetized_cells:=0;
    for current_port:=low_port to high_port do
    begin nr_of_packetized_cells:=nr_of_packetized_cells+packetized_cells(current_lim,current_port)end;
    { nr_of_packetized_cells indicates the number of cells that have been packetized in LIM current_lim }
    if nr_of_packetized_cells>0 then
    begin age_oldest_lim_byte:=inf;
        for current_port:=low_port to high_port do
        begin if packetized_cells(current_lim,current_port)>0 then
            begin age_oldest_lim_port_byte:=in_queue_time(oldest_cell(current_lim,current_port))-packetization_delay;
                if age_oldest_lim_port_byte<age_oldest_lim_byte
                    then age_oldest_lim_byte:=age_oldest_lim_port_byte
            end
        end;
        { next, the priority is determines }
        priority:=15-Trunc((current_time-age_oldest_lim_byte)/scaling_time);
        if priority<minimum_priority the
        begin lim_selected_for_transmission:=current_lim;
            if priority>=0
                then minimum_priority:=priority
                else minimum_priority:=0
        end
    end
end;
{ now, lim_selected_for_transmission indicates the number of the LIM that will transmit a cell upstream }
```

FIG. 3

DATA TRANSMISSION SYSTEM AND INTERFACE MODULE AND PRIORITY GENERATION MEANS INCLUDED THEREIN

TECHNICAL FIELD

The present invention relates to a data transmission system including a plurality of interface modules interfacing a plurality of input bitstreams with a common transmission medium, each of said interface modules including packetizing means to arrange each of said bitstreams applied to it in packets and storage means to store said packets prior to accessing said common transmission medium, each of said interface modules having a priority on the basis of which said access is assigned.

BACKGROUND OF THE INVENTION

Such a system is well known in the art and is for instance described in the not yet published European Patent Application 92870049.1 (Deloddere 2). In the latter application the interface module controls the access of the packets to the transmission means based on a priority value assigned to each of the modules. This value can be fixed or variable.

In case of fixed value the criterium for access assignment is fixed. This criterium can for instance be the location of the interface module or the type of information contained in the packet. The criterium is chosen at start up of the interface module and can not be changed during its working.

In the case of variable priority values conventional systems mostly use the number of packets waiting for transmission in the storage means, more specifically a waiting queue of the interface module, to determine the priority value. As a result thereof transmission by a module of high-bitrate packets is favoured compared to the transmission of low-bitrate packets since the former packets more quickly fill the waiting queue than the latter ones.

Moreover in these conventional systems and when the priorities are variably assigned as described above predetermined types of packets accessing the transmission means via the same interface module cannot be favoured compared to other types, e.g. telephony packet cannot be favoured compared to data packets.

SUMMARY OF THE INVENTION

An object of the invention is to provide a data transmission system of the above type but which does not incorporate the above drawbacks, i.e. to provide a data transmission system where the mentioned module priorities can be assigned in a flexible way, possibly using more than one criterium or even criteria changing during the working of the modules and where fair access is realized, i.e. where high bitrate packets are for instance not automatically favoured compared to low bitrate ones or vice versa.

This object is achieved due to the fact that each of said interface modules additionally includes packet priority determining means to determine for each of the packets stored in said storage module a packet priority as a function of its storage time in said storage means and of at least one packet characterizing parameter, and interface module priority determining means which in response to the thus obtained packet priorities generates said interface module priority.

Such a characterizing parameter can for instance be the time interval needed to arrange the bitstream in packets, i.e. the packetization delay, and/or the type of information contained in said data packet.

When taking into account the packetization delay together with the storage time, the age of the oldest byte of a packet is in fact taken into account, i.e. the arrival time of the first byte of a packet at the interface module is taken into account instead of the arrival time of the bytes in the storage means as in conventional systems. In this way minimum wait times ape ensured for high-bitrate as well as for low-bitrate bitstreams, i.e. fair access is realized. For example a byte A of a low-bitrate bitstream, arriving at the interface module before a byte B of a high-bitrate bitstream can, because of its higher packetization delay be queued as part of a packet P1 after the queueing of a packet P2 including B. Taking into account the packetization delay, P1 will nevertheless access the transmission means before P2 because it is older than P2 whilst, in the known system where access is based on the filling degree of the wait queue P2 would have accessed the transmission means before P1 which is not fair since the oldest byte of P1 has been waiting for transmission for a longer time than the oldest byte of P2.

But, on the other hand or in addition, taking into account the type of information contained in the packet, some packet types can be favoured compared to other ones.

By determining the packet priorities as a function of the storage time and of the packetization delay, priorities can thus be assigned in a flexible way, due to the possibly changing values of these parameters, more than one criterium can be taken into account and the criteria for access control can be changed by taking into account, e.g. as result of an operator command, or other characterizing parameters. However minimal wait times can be obtained and a fair access can be realized by taking into account the packetization delays of the packets as a packet characterizing parameter.

A characteristic feature of the data transmission system according to the invention is that said packet priority determining means includes a plurality of counters, each of which is associated with at least one of said packets stored in said storage means, the initial value of each of said counters being preset to a predetermined initial value and each of said counters, upon storage of a first subpacket of said associated packet in said storage means, starting to regularly decrement said initial value with a predetermined value and at predetermined decrement intervals, said predetermined initial value, said predetermined decrement value and said predetermined decrement intervals being determined on the basis of said packet characterizing parameters and said counter values being indicative of said packet priorities, and that said interface module priority determining means includes comparison means to compare the values of said counters when said access is allowed, and to derive said module priority from the result of said comparison.

Another characteristic feature of the system according to the invention is that said packet priority determining means includes a plurality of counters, each of which is associated with at least one of said packets stored in said storage means, the initial value of each of said counters being preset to a predetermined initial value and each of said counters, upon storage of a first subpacket of said associated packet in said storage means, starting to regularly increment said initial value with a predetermined value and at predetermined increment intervals, said predetermined initial value, said predetermined increment value and said predetermined increment intervals being determined on the basis of said packet characterizing parameters and said counter values being indicative of said packet priorities, and that said interface module priority determining means includes comparison means to compare the values of said counters when said access is allowed, and to derive said module priority from the result of said comparison.

Thereby the generation of the priority value is realized either in a hardware or in a software manner by means of counter circuits or software counters respectively. Assignment of the predetermined initial value, the decrement/increment interval and the decrement/increment value make it possible to take into account different package characteristics, e.g. to favour some types of bit stream compared to other ones whilst taking into account the wait time of the packets by the choice of these values. Speech packets can for example be favoured compared to data packets by assigning a lower initial value or a higher decrement or increment value, or a smaller decrement or increment interval to the counters relating to speech packets than to those related to data packets.

Still another characteristic feature of the data transmission system according to the invention is that said packet priority determining means and said interface module priority determining means are realized by processing means.

In this way the module priority value is completely determined by means of a software program.

The present invention also relates to an interface module such as those included in the above described new data transmission system and to a priority determining means included in this interface module and which includes a packet priority determining means and an interface module priority determining means as those described above.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein:

FIG. 3 represents a software program in pseudo code used in another embodiment of PG of FIG. 2.

BEST MODE FOR CARRYING OUT THE INVENTION

Figure 1:
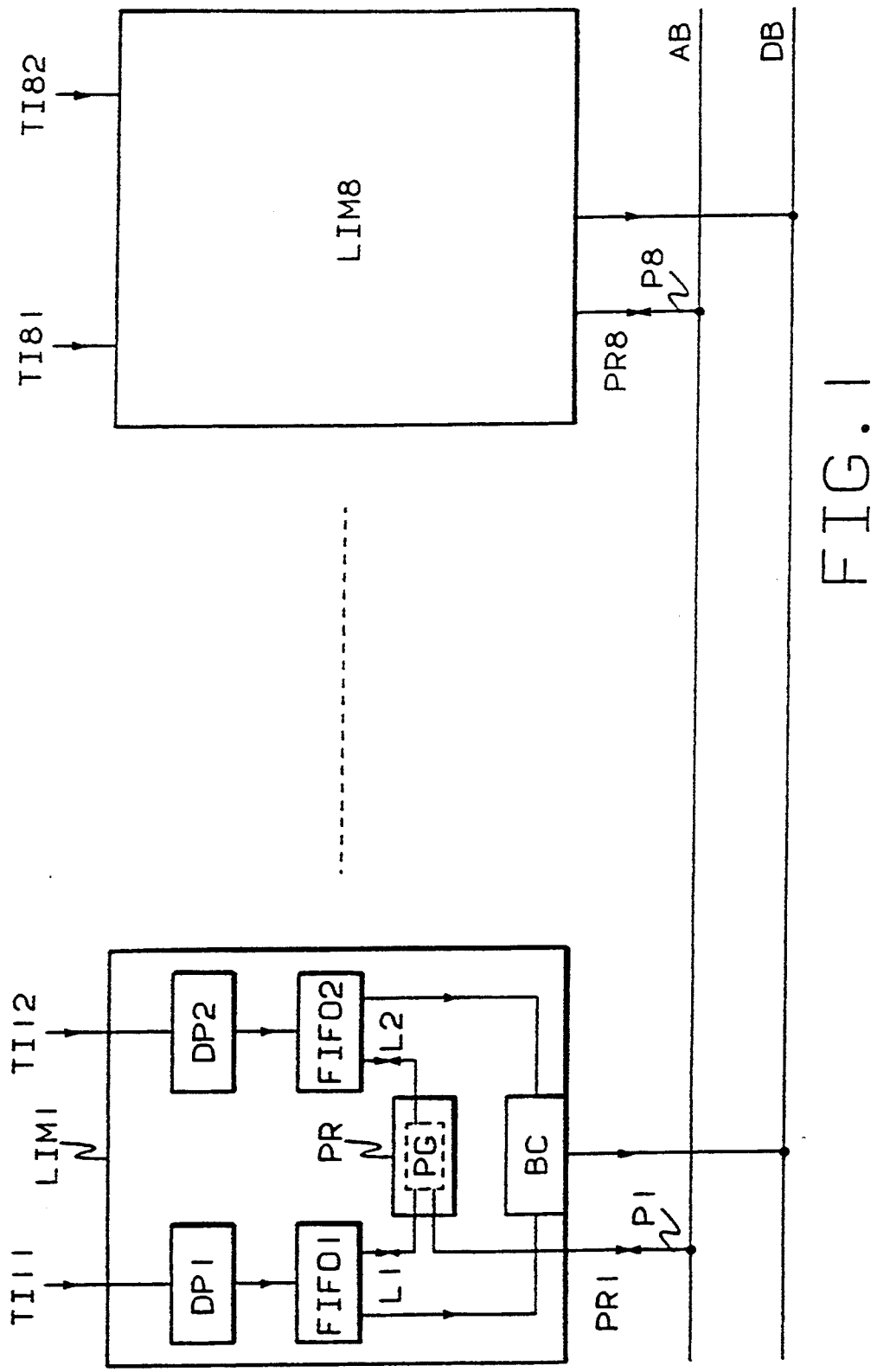
FIG. 1 represents an access control arrangement including interface modules LIM1 to LIM8 included in a data transmission system according to the invention.

The access control arrangement represented in FIG. 1 includes 8 interface modules LIM1 to LIMB of which only LIM1 is represented in more detail. These interface modules control access of bitstreams which ape received via terminal interface connections, TI11 and TI12, . . . , TI81, TI82 to a common transmission means, more specifically a data bus DB, to which all interface modules are connected.

Each of these interface modules is additionally connected to an access bus AB through a bidirectional line P1, . . . P8 respectively and is able to generate on this line priority values PR1, . . . PR8 respectively and to transmit them on the latter bus AB. Each interface module also includes a processing unit, such as PR for LIM1, which determines whether the module may access the data bus DB or not, based on the transmitted priority values and which generates this value for the module it is included in.

Following is now a more detailed description of the interface module LIM1 but which is equally applicable to the other interface modules.

LIM1 includes two data packetizing circuits DP1 and DP2 which are able to receive respective bitstreams from TI11 and TI12, to arrange these bitstreams in packets and to store these packets in respective first-in-first out queueing registers FIFO1 and FIFO2 under the form of bytes. Via respective bidirectional connections L1 and L2 these registers are linked to the processing unit PR.

Data packetizer circuits such as DP1 and DP2 are well known in the art and ape therefore neither described nor shown in detail.

PR is linked to the access bus AB via the bidirectional connection P1 and includes a priority generator PG which generates the above mentioned priority value PR1. Registers FIFO1 and FIFO2 are additionally connected to a bus controller circuit BC which is an interface circuit by which a packet queued in such a register accesses the data bus DB.

The generation of the priority value excepted, processing units having the functionality of PR are well known in the art. An embodiment thereof is for instance described in the earlier mentioned European Patent Application. For this reason only the priority generator PG is described in detail hereafter.

In an embodiment of PG represented in FIG. 2, the priority value PR1 is generated on the basis of the age of the oldest packet byte stored in FIFO1 or FIFO2, as will be explained later. To simplify the description of the operation of PG the registers FIFO1 and FIFO2 are supposed to be able to contain only a single packet. Generalisation to registers storing more packets is obvious.

Figure 2:
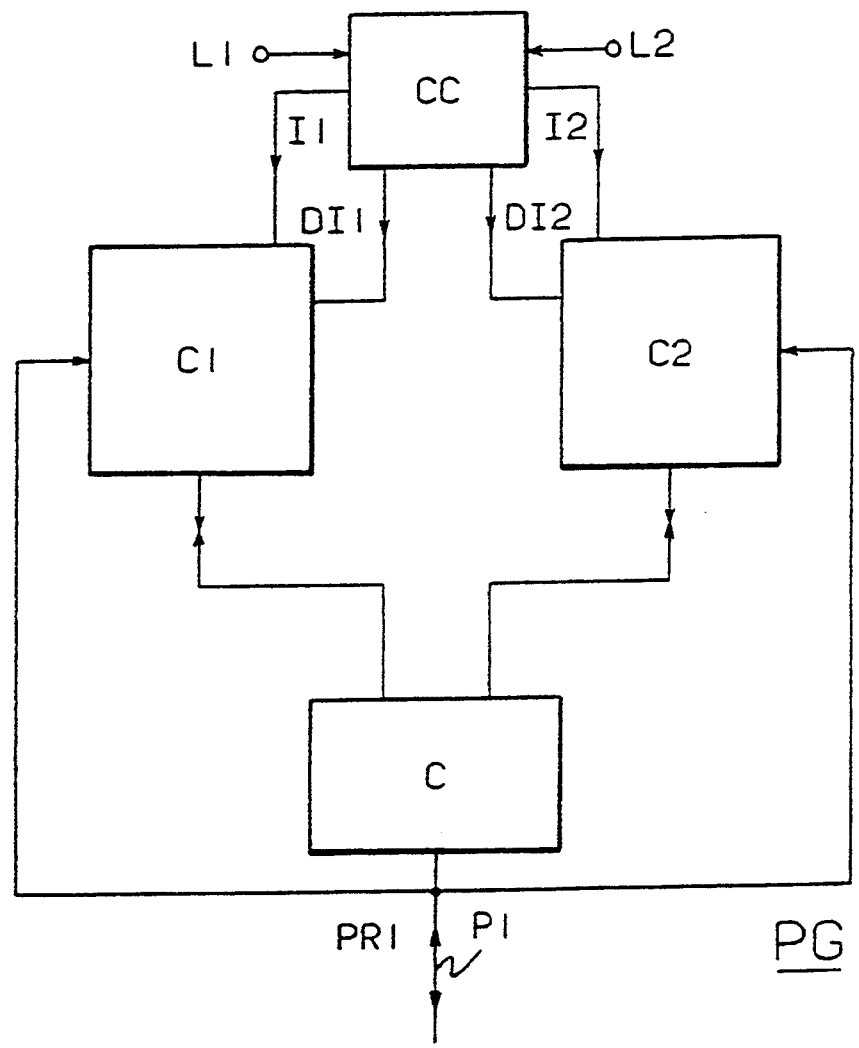
FIG. 2 shows an embodiment of the priority generator PG of LIM1 of FIG. 1.

The priority generator PG of FIG. 2 includes a control circuit CC to respective inputs of which the above connections L1 and L2 are linked, and two counter circuits C1 and C2 controlled by CC via connections I1 and DI1, and, I2 and DI2 respectively and by a control signal also received via the connection P1. An output of each counter is via a bidirectional link connected to a corresponding input of a comparison circuit C which is coupled to the connection P1.

To be noted is that the number of counter circuits is, as will be explained later, linked to the number of packets able to be queued in FIFO1 and FIFO2. Since this number is 1 for each of FIFO1 and FIFO2, only two counters are provided.

The priority generator operates as described hereafter.

When the first byte of a packet is for instance queued in register FIFO1 by DP1 this register sends an indication thereof to CC via L1. C1 is preset via I1 after which CC applies decrement-by-1 counting pulses to C1 via DI1. These counting pulses have a predetermined period.

In an analogous way the bytes of a packet are stored in FIFO2 and the counter C2 is decremented by counting pulses applied via DI2 and having also a predetermined period which might be different from the counting pulses applied via DI1.

At the moment the earlier mentioned control signal is applied to both the counters C1 and C2 via the connection P1, these counters apply their count values to the comparison circuit C which, under the control of the same control signal, compares these count values. C detects the lowest one of these counter values and transmits this value to AB as the priority value of the interface module C belongs to, thereby implying that a low value corresponds to a high priority. It also passes to the counter which generated the lowest value an indication to stop its count. This counter can then be used for a subsequently queued packet.

The above mentioned control signal is a grant signal sent via the access bus AB by a not shown bus control module. It indicates that a packet may be put on the data bus DB.

The thus transmitted priority values PR1 to PR8 are handled by PR to control the access of the packets to DB in the way described in the above mentioned patent application.

It has to be noted that instead of just taking the count value of the counter as a priority value, more complicated calculation algorithms can be used to determine PR1/8 based on this count which depends on the predetermined initial value, the predetermined decrement value and the predetermined decrement period.

These predetermined values are consequently used to take into account at least one predetermined characteristic of the packets, which in this embodiment is the packetization delay of the packets. Indeed, the higher the packetization delay of a packet, the lower the initial count value assigned to the corresponding counter by C whilst all counters are decremented at the same rate. It should be noted that C could also assign the same initial value to the counters and make sure that the counter associated with packets having a large packetization delay are decremented at a higher rate.

Additional characteristics of the packets such as their content can be taken into account by manipulating the predetermined values additionally to the manipulation described above. Supposing for example that the packetization delay was taken into account by manipulating the initial value, the type of information contained in the packet can additionally be taken into account by manipulating e.g. the decrement interval.

It should also be noted that in the considered embodiment the predetermined values can additionally be provided by CC as a function of the storage capability of FIFO1 and FIFO2, of the arrival rate of the bit streams and of the size of the packets, the latter two parameters in fact determining the packetization delay of the packets.

Indeed, if for example the storage capability of the register(s) of LIM1 is relatively large, more packets can be queued therein and it is not required for LIM1 to have frequent access to the bus provided of course that the packets may be delayed. Consequently, provided that the arrival rate of the bits of the packet is not too high, whilst the packet size is not too small, i.e. that the queues are not filled to quickly, the priority of the interface module need not be relatively high and thus a high preset count value, or a high decrement period or a low decrement value may be choosen. Likewise, by for instance reducing the decrement period or increasing the decrement value of e.g. C1 so that they become lower, respectively higher than those of C2, the packets stored in FIFO1 are favoured compared to those stored in FIFO2.

PG is thus a flexible, configurable priority calculation module.

Moreover, the initial value and the decrement value and decrement time interval determine the scaling of the calculated priorities, which in this embodiment have to lay between 0, which represents a highest priority, and 15, representing a lowest priority.

Typical values for the initial count value, for the decrement value and for the decrement interval are for example 15, 1 and 100 us respectively and this for a bitrate of 2 Mbit/s, a packet size of 32 bytes, and a queue length of 15.

It has to be noted that the above parameters, i.e. the initial count value, the decrement value and interval can be assigned per interface module, per wait queue or even per received packet, depending on the criterium determining the priority value and/or on the type of bitstreams received by the interface module. Also, only one counter of a queue, namely the one dedicated to the first queue packet can be passed to C instead of all counters of all packets of the queue when that queue contains analogous packets, i.e. packets of the same type and size, derived from bitstreams having the same bitrate, since in that case the packet first received in the queue automatically contains the oldest byte of the whole queue. By taking into account a counter pep packet however, different types of packets may be queued on the same queue.

Another embodiment of PG is realized by a software program, the main part of which is represented in pseudo code, in FIG. 3.

To determine the age of the oldest byte of a queue the program uses as input data the packetization delay, i.e. packetization_delay, and the instant at which an oldest packet or cell, i.e. the first packet of the queue, entered a considered queue of an interface module, i.e. oldest_cell (current_lim, current_port), a queue in that case being associated with each access port of the interface module and each queue only queueing analogous packets which corresponds to, in the earlier described embodiment, C, only one counter per queue since the oldest packet of the queue then contains the oldest byte.

The represented program determines for each port, i.e. in case of LIM1 the access of TI1 and TI2 to it, of each interface module (current_lim) the age of the oldest byte (age_oldest_lim_port_byte) received at the port, i.e. the oldest byte in the queue associated with the latter port since as mentioned earlier the queue only contains analogous packets. This is done in the statement "age_oldest_lim_port_byte:=in_queue_time (oldest_cell (current_lim, current_port))—packetization_delay" "age_oldest_lim_port_byte" thus corresponds to the instant in time at which the first byte of a first queued packet (oldest_cell) was presented at the data packetizer coupled to the considered queue. The cell or packet for which this instant is the lowest contains the oldest byte. The age of this oldest byte is determined for each port of an interface module and the obtained ages are compared to find the oldest queued byte of the latter module (age_oldest_lim_byte).

The program then calculates the priority of the interface module in the statement "priority:=15_Trunc ((current_time_age_oldest_lim_byte)/scaling_time), where current_time is the current time, current_time_age_oldest_lim_byte corresponds to the time interval the oldest byte of the queue, i.e. the first byte of the first packet of the queue, is waiting for access to the communication channel and scaling_time is used as scaling factor so that resulting integer priority values vary from 0 to 15. Scaling_time is dependent on the maximum capacity Of the queues FIFO1 and FIFO2 and on the maximum packetization time, i.e. on the bitrate of the received bitstream and on the size of the packets. It is not only used as a scaling factor as the initial counter value and the decrement value and interval in the above described first embodiment but also, just as the above parameters, to advantage access of some data packet types compared to other ones.

The above description of this other embodiment implies that in this embodiment PG has to include a processing unit to run the described program, a timer circuit to measure the time of entrance on a queue of each queued packet and to measure the current time, and a memory module to store the above entrance time for each packet. It also has to include means for detecting whether a queue is empty or not.

Based on the above description of the working of the second embodiment of the module PG, the latter module is obvious to realize by a person skilled in the art and it is therefore not described in more details.

It has to be noted that embodiments of the interface module and of the priority generation means have not to be restricted to two waiting queues. Usually the number of queues corresponds to the number of services provided or to the number of ports of the interface module, which can of course be more than two.

While the principles of the invention have been described above in connection with specific apparatus, it is to be clearly understood that this description is made only by way of example and not as a limitation on the scope of the invention.

We claim:

1. A data transmission system including a plurality of interface modules (LIM1/8) interfacing a plurality of input bitstreams (TI11/12) with a common transmission medium (DB), each of said interface modules including packetization means (DP1/2) to arrange each of said bitstreams (TI11/12) applied to it in packets and storage means (FIFO1/2) to store said packets prior to accessing said common transmission medium (DB), each of said interface modules having a priority on the basis of which said access is assigned by a processing module (PR) coupled to said storage means, characterized in that each of said interface modules additionally includes packet priority determining means to determine for each of the packets stored in said storage means a packet priority as a function of the time of storage of said packet in said storage means and of at least one packet characterizing parameter, and interface module priority determining means which in response to the thus determined packet priorities generates said priority of said interface module, said packet priority determining means including a plurality of counters (C1, C2), each of which is associated with at least one of said packets stored in said storage means, each of said counters being preset to a predetermined initial counter value and upon storage in said storage means of a first subpacket of said associated packet in said storage means, starting to regularly change said initial counter value by a predetermined value and at predetermined intervals under control of a control module (CC) coupled to said storage means, said initial counter value, said predetermined value and said predetermined intervals being determined by said packet characterizing parameters and said counter values being indicative of said packet priorities, and said interface module priority determining means including comparison means (C) to mutually compare said counter values when said common transmission medium (DB) may be accessed, and to derive said priority of said interface module from the result of said comparison.

2. A data transmission system according to claim 1, characterized in that said packet priority determining means and said interface module priority determining means are realized by processing means.

3. A data transmission system according to claim 1, characterized in that one of said packet characterizing parameters is the time interval needed to arrange each of said bitstreams in packets.

4. A data transmission system according to claim 1, characterized in that one of said packet characterizing parameters is the type of information contained in said packets.

5. An interface module for use in a data transmission system including a plurality of said interface modules (LIM1/8) interfacing a plurality of input bitstreams (TI11/12) with a common transmission medium (DB), each of said interface modules including packetizing means (DP1/2) to arrange each of said bitstreams (TI11/12) applied to it in packets and storage means (FIFO1/2) to store said packets prior to accessing said common transmission medium (DB), each of said interface modules having a priority on the basis of which said access is assigned by a processing module (PR) coupled to said storage means, characterized in that each of said interface modules additionally includes packet priority determining means to determine for each of the packets stored in said storage means a packet priority as a function of the time of storage of said packet in said storage means and of at least one packet characterizing parameter, and interface module priority determining means (PC) which in response to the thus determined packet priorities generates said priority of said interface module, said packet priority determining means including a plurality of counters (C1, C2), each of which is associated with at least one of said packets stored in said storage means, each of said counters being preset to a predetermined initial counter value and upon storage in said storage means of a first subpacket of said associated packet in said storage means, starting to regularly change said initial counter value by a predetermined value and at predetermined intervals under control of a control module (CC) coupled to said storage means, said initial counter value, said predetermined value and said predetermined intervals being determined by said packet characterizing parameters and said counter values being indicative of said packet priorities, and said interface module priority determining means including comparison means (C) to mutually compare said counter values when said common transmission medium (DB) may be accessed, and to derive said priority of said interface module from the result of said comparison.

6. An interface module according to claim 5, characterized in that said packet priority determining means and said interface module priority determining means are realized by processing means.

7. An interface module according to claim 5, characterized in that one of said packet characterizing parameters is the time interval needed to arrange each of said bitstreams in packets.

8. An interface module according to claim 5, being indicative of said packet priorities, and that said interface module priority determining means includes comparison means to compare the values of said counters when said access is allowed, and to derive said module priority from the result of said comparison.

9. A priority calculation means included in at least one interface module of a data transmission system including a plurality of said interface modules (LIM1/8) interfacing a plurality of input bitstreams (TI11/12) with a common transmission medium (DB), each of said interface modules including packetizing means (DP1/2) to arrange each of said bitstreams (TI11/12) applied to it in packets and storage means (FIFO1/2) to store said packets prior to accessing said common transmission medium (DB), each of said interface modules having a priority on the basis of which said access is assigned by a processing module (PR) coupled to said storage means, characterized in that each of said interface modules additionally includes packet priority determining means to determine for each of the packets stored in said storage means a packet priority as a function of the time of storage of said packet in said storage means and of at least one packet characterizing parameter, and interface module priority determining means which in response to the thus determined packet priorities generates said priority of said interface module, said packet priority determining means including a plurality of counters (C1, C2), each of which is associated with at least one of said packets stored in said storage means, each of said counters being preset to a predetermined initial counter value and upon storage in said storage means of a first subpacket of said associated packet in said storage means, starting to regularly change said initial counter value by a predetermined value and at predetermined intervals under control of a control module (CC) coupled to said storage means, said initial counter value, said predetermined value and said predetermined intervals being determined by said packet characterizing parameters and said counter values being indicative of said packet priorities, and said interface module priority determining means including comparison means (C) to mutually compare said counter values when said common transmission medium (DB) may be accessed, and to derive said priority of said interface module from the result of said comparison.

10. A priority calculation means according to claim 9, characterized in that said packet priority determining means and said interface module priority determining means are realized by processing means.

11. A priority calculation means according to claim 9, characterized in that one of said packet characterizing parameters is the time interval needed to arrange each of said bitstreams in packets.

12. A priority calculation means according to claim 9, characterized in that one of said packet characterizing parameters is the type of information contained in said packets.

13. A data transmission system according to claim 1, wherein said initial counter value is decremented by said predetermined value.

14. A data transmission system according to claim 1, wherein said initial counter value is incremented by said predetermined value.

15. An interface module according to claim 5, wherein said initial counter value is decremented by said predetermined value.

16. An interface module according to claim 5, wherein said initial counter value is incremented by said predetermined value.

17. A priority calculation means according to claim 9, wherein said initial counter value is decremented by said predetermined value.

18. A priority calculation means according to claim 9, wherein said initial counter value is incremented by said predetermined value.

* * * * *

UNITED STATES PATENT AND TRADEMARK OFFICE
CERTIFICATE OF CORRECTION

PATENT NO. : 5,402,423
DATED : March 28, 1995
INVENTOR(S) : Van Kersen et al.

It is certified that error appears in the above-indentified patent and that said Letters Patent is hereby corrected as shown below:

Claim 8, column 8, line 66 after "claim 5," insert -- characterized in that one of said packet characterizing parameters is the type of information contained in said packets. --

Claim 8, column 8, line 66 after "claim 5," please delete "being indicative of said packet priorities, and that said interface module priority determining means includes comparison means to compare the values of said counters when said access is allowed, and to derive said module priority from the result of said comparison."

UNITED STATES PATENT AND TRADEMARK OFFICE
CERTIFICATE OF CORRECTION

PATENT NO. : 5,402,423
DATED : March 28, 1995
INVENTOR(S) : Van Kersen et al

It is certified that error appears in the above-indentified patent and that said Letters Patent is hereby corrected as shown below:

Claim 5, column 8, line 36 "PC" should read --PG--.

Signed and Sealed this

Eleventh Day of July, 1995

BRUCE LEHMAN

*Attest:*

*Attesting Officer*  *Commissioner of Patents and Trademarks*